US010486181B2

(12) United States Patent
Daykin et al.

(10) Patent No.: US 10,486,181 B2
(45) Date of Patent: Nov. 26, 2019

(54) APPARATUS FOR COATING PIPES

(75) Inventors: Damian Daykin, Lancashire (GB);
Christofer Ratcliffe, Preston (GB);
Michael George, Burnley (GB)

(73) Assignee: PIPELINE INDUCTION HEAT LIMITED, Burnley (GB)

(*) Notice: Subject to any disclaimer, the term of this patent is extended or adjusted under 35 U.S.C. 154(b) by 1042 days.

(21) Appl. No.: 12/673,971

(22) PCT Filed: Aug. 15, 2008

(86) PCT No.: PCT/GB2008/002757
§ 371 (c)(1),
(2), (4) Date: Mar. 1, 2011

(87) PCT Pub. No.: WO2009/024755
PCT Pub. Date: Feb. 26, 2009

(65) Prior Publication Data
US 2011/0159192 A1   Jun. 30, 2011

(30) Foreign Application Priority Data
Aug. 17, 2007   (GB) .................................. 0716074.0

(51) Int. Cl.
*B05B 13/04*     (2006.01)
*B05C 9/14*      (2006.01)
(Continued)

(52) U.S. Cl.
CPC ...... *B05B 13/0436* (2013.01); *B05B 13/0478* (2013.01); *B05C 9/14* (2013.01);
(Continued)

(58) Field of Classification Search
USPC .................. 118/307–308, 313, 323, DIG. 11, 118/641–643
See application file for complete search history.

(56) References Cited

U.S. PATENT DOCUMENTS 3,108,022 A * 10/1963 Church ........................... 118/58
3,208,868 A *  9/1965 Strobel et al. ................ 118/309
(Continued)

FOREIGN PATENT DOCUMENTS

EP   1016514 A2   7/2000
GB   2044135 A    10/1980
(Continued)

OTHER PUBLICATIONS

Goldfarb, McGuchan, Thermal Degradation of Polyesters, Oct. 1968.*

*Primary Examiner* — Binu Thomas
(74) *Attorney, Agent, or Firm* — Kofi A. Schulterbrandt; Michael P. Leary

(57) ABSTRACT

Apparatus for coating a pipe. The apparatus includes a first frame to be mounted on a pipe and a second frame rotatably mounted on the first frame. An induction heating coil comprised of electrical conductors is mounted on the apparatus. A coating applicator is mounted on the second frame and is arranged to apply coating onto a surface of the pipe on which the apparatus is mounted. The first frame, second frame and coating applicator are arranged such that when the apparatus is mounted on the pipe, the applicator is disposed to one side of the induction heating coil and able to apply coating to a surface of the pipe alongside the surface of the pipe underlying the induction heating coil. The first frame may be operable between an open state in which the frame may be placed over and removed from a pipe and a closed state in which the frame may capture a pipe thereby to mount the apparatus on the pipe.

33 Claims, 4 Drawing Sheets

(51) Int. Cl.
   *H05B 6/44*   (2006.01)
   *B29C 63/00*  (2006.01)
   *F16L 58/10*  (2006.01)
   *F16L 58/18*  (2006.01)

(52) U.S. Cl.
   CPC ...... *B05D 2254/02* (2013.01); *B29C 63/0069* (2013.01); *F16L 58/1072* (2013.01); *F16L 58/181* (2013.01); *H05B 6/44* (2013.01)

(56) References Cited

U.S. PATENT DOCUMENTS

| | | | | |
|---|---|---|---|---|
| 3,965,551 | A | * | 6/1976 | Ostrowski ..................... 29/33 D |
| 4,007,705 | A | * | 2/1977 | Sherer et al. ................. 118/307 |
| 4,388,510 | A | * | 6/1983 | Hughes ......................... 219/643 |
| 4,595,607 | A | * | 6/1986 | Betteridge et al. ........... 118/307 |
| 4,752,497 | A | * | 6/1988 | McConkey et al. .......... 427/470 |
| 5,178,902 | A | * | 1/1993 | Wong et al. .................. 427/470 |
| 5,186,755 | A | * | 2/1993 | Carlson, Jr. ......... B05B 13/0436 118/307 |
| 5,385,609 | A | * | 1/1995 | Rose et al. .................... 118/119 |
| 5,417,786 | A | * | 5/1995 | Denman ............... B29C 63/105 156/187 |
| 2004/0083957 | A1 | | 5/2004 | Latvis |

FOREIGN PATENT DOCUMENTS

| | | |
|---|---|---|
| GB | 2244942 A | 12/1991 |
| WO | 9007984 A2 | 7/1990 |
| WO | WO 9007984 A * | 7/1990 |

\* cited by examiner

APPARATUS FOR COATING PIPES

The present invention relates to apparatus for coating pipes and particularly, but not exclusively, the joined end sections of pipes forming a pipeline, referred to as field joints.

Oil, gas and other pipelines are usually formed from multiple lengths of externally coated steel pipe welded together to form a pipeline. The individual lengths of pipe are coated, at a factory remote from where the pipeline is laid, to prevent corrosion and/or other damage to the pipe, leaving a short uncoated region of around 15 cms in length at each end. This is necessary to enable the lengths of pipe to be welded together end to end to form a pipeline at the site where the pipeline is laid. After welding, the exposed region of steel pipe either side of the weld (the field joint) must be coated before the pipeline is laid.

A variety of pipe coating techniques are employed depending upon the environment in which the pipeline is to be laid. A variety of apparatus is available to carry out coating of pipeline field joints, largely aimed at reducing the time required to coat field joints, but also helping to ensure a consistent application of coating. Laying a pipeline typically involves coating several thousand field joints. Even a small saving in the time required to coat each joint can lead to a significant overall time, and therefore cost saving.

Some pipe coating techniques require that the pipe is heated to an elevated temperature so that an applied coating correctly adheres to the pipe and cures. This is particularly so where the coating is applied in a cold climate. In other techniques heating is not essential, but still desirable as it reduces the time it takes the coating to cure. One example is a liquid epoxy coating system.

Where heating is required to aid coating this has conventionally been achieved by mounting an induction heating coil on the pipe, heating the pipe, removing the heating coil, mounting coating apparatus on the pipe and coating the pipe.

Having to use two machines sequentially is time consuming. Also, where pipelines are being laid in cold conditions the coating of pipe joints is usually carried out in an enclosure, to provide a protected environment. Using two bulky machines in the confines of an enclosure can be inconvenient.

Apparatus has been proposed in the past which combines pipe heating and coating functions. An example is shown in GB 2285596. This apparatus is, however, limited to the application of a moulded shell to a pipe joint. Further, positioning of the induction heating coil outside the die set means that it is spaced from the pipe, reducing the efficiency with which the coil can heat the pipe.

It is an object of the present invention to provide an alternative, improved, apparatus capable of heating and applying a coating to pipeline field joints and, in particular, to apparatus capable of spraying a coating, especially a liquid coating, on to field joints.

According to a first aspect of the present invention there is provided apparatus for coating a pipe, the apparatus comprising a first frame arranged to be mounted on a pipe, electrical conductors mounted on the apparatus arranged to form an induction heating coil which encircles a pipe on which the first frame is mounted, a second frame rotatably mounted on the first frame, and a coating applicator mounted on the second frame and arranged to apply a coating onto a surface of a pipe on which the apparatus is mounted, wherein the first and second frames and the coating applicator are arranged such that when the apparatus is mounted on a pipe the coating applicator is disposed to one side of the induction heating coil and able to apply coating to a surface of the pipe alongside the surface of the pipe underlying the induction heating coil.

According to a second aspect of the present invention there is provided apparatus for coating a pipe, the apparatus comprising a first frame operable between an open state in which the frame may be placed over and removed from a pipe and a closed state in which the frame may capture a pipe thereby to mount the apparatus on the pipe, electrical conductors mounted on the apparatus and arranged to form an induction heating coil when the first frame is in the closed state, a second frame rotatably mounted on the first frame and operable with the first frame between an open state and a closed state, and a coating applicator mounted on the second frame and arranged to apply a coating onto a surface of a pipe on which the apparatus is mounted, wherein the first and second frames and the coating applicator are arranged such that when the apparatus is mounted on a pipe and the first and second frames are in the closed state the coating applicator is disposed to one side of the induction heating coil and able to apply coating to a surface of the pipe alongside the surface of the pipe underlying the induction heating coil.

As the coating applicator is to the side of the induction heating coil when the apparatus is mounted on a pipe this enables the induction heating coil to be positioned more closely to the pipe than with the arrangement of GB 2285596. This increases the efficiency with which the pipe can be heated. Similarly the arrangement also allows greater spacing between the surface of the pipe and a coating applicator, which is desirable, for example, where the applicator is arranged to spray a liquid coating. In this case sufficient space is required to enable a spray of coating to fan out to the width of pipe surface to be coated. After heating the apparatus can be moved relative to the pipe, along the pipe, so that the coating applicator can apply a coating over the surface of the pipe heated by the induction coil. This movement can be effected more quickly than exchanging a heating apparatus for a coating apparatus.

With apparatus according to either the first or second aspect of the invention, the induction heating coil may be mounted on the first frame or the second frame.

With apparatus according to the second aspect of the invention the first frame may comprise at least two pivotally connected sections. In one embodiment there are two generally semi-circular sections. The first frame is preferably arranged so that when mounted on a pipe it may be substantially rotationally fixed relative to the pipe. Further, when mounted on a pipe and in the closed position the first frame preferably encircles the pipe. The first frame may be arranged to be movable longitudinally along a pipe when mounted on the pipe and in the closed state. The first frame may be movable longitudinally along a pipe when partially opened, that it to say between the closed and open states.

With apparatus according to either the first or second aspect of the invention the first frame preferably has an end face and the second frame is preferably mounted on the end face. As such the first and second frames will be disposed adjacent each other along the long axis of a pipe on which the apparatus is mounted.

The second frame is preferably mounted on the first frame by way of wheels or bearings which allow the second frame to rotate relative to the first frame. The second frame may be formed from at least two, separate, generally arcuate members. The total arc length of the arcuate members of the second frame is preferably greater than 360 degrees, so that when mounted on the first frame the arcuate members forming the second frame overlap.

Forming the second frame from two or more separate arcuate members enables the second frame to have a different radius to the first frame and yet still move between open and closed states together with the first frame, where apparatus according to the second aspect of the invention is concerned.

Likewise, for apparatus according the second aspect of the invention a latch means may be provided to releasably lock the arcuate members of the second frame together. For either aspect a clamping means may be provided to lock the arcuate members of the second frame relative to the first frame.

A drive means may be provided to rotate the second frame relative to the first frame. The drive means may comprise one or more motors mounted on the first frame.

The coating applicator may be arranged to spray a liquid or powder coating and may be a spray gun.

Embodiments of the apparatus effectively combine induction heating and spray coating apparatus. This facilitates faster and more efficient heating and coating of pipes, and particularly of field joints, than with separate heating and coating apparatuses. Also, the overall bulk of the apparatus is reduced, an advantage where coating is carried out in an enclosure.

In order that the invention may be more clearly understood embodiments thereof will now be described, by way of example, with reference to the accompanying drawings of which:

Figure 1:
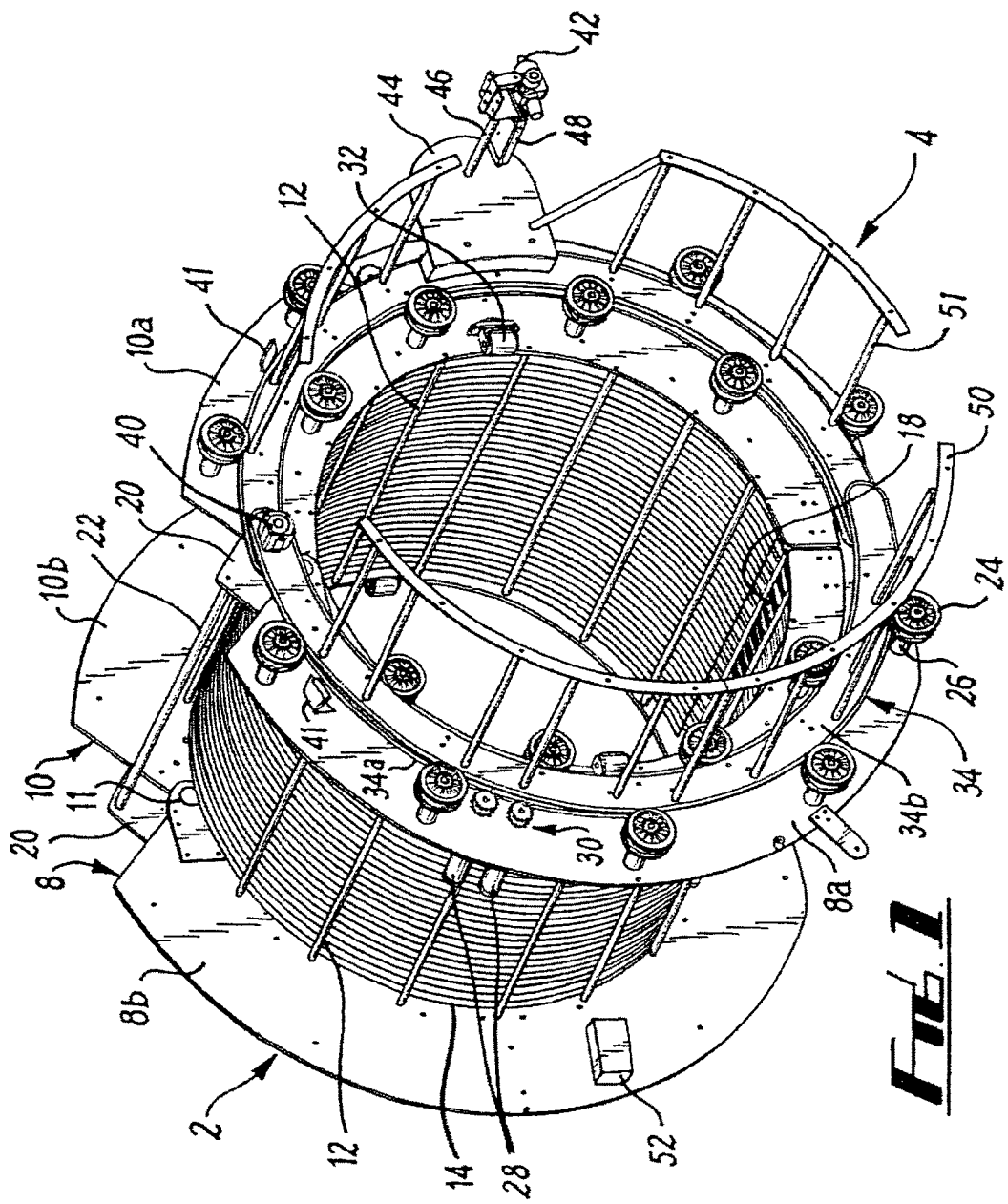
FIG. 1 is a front perspective view of apparatus for coating pipes, with the apparatus in a closed position.
Figure 2:
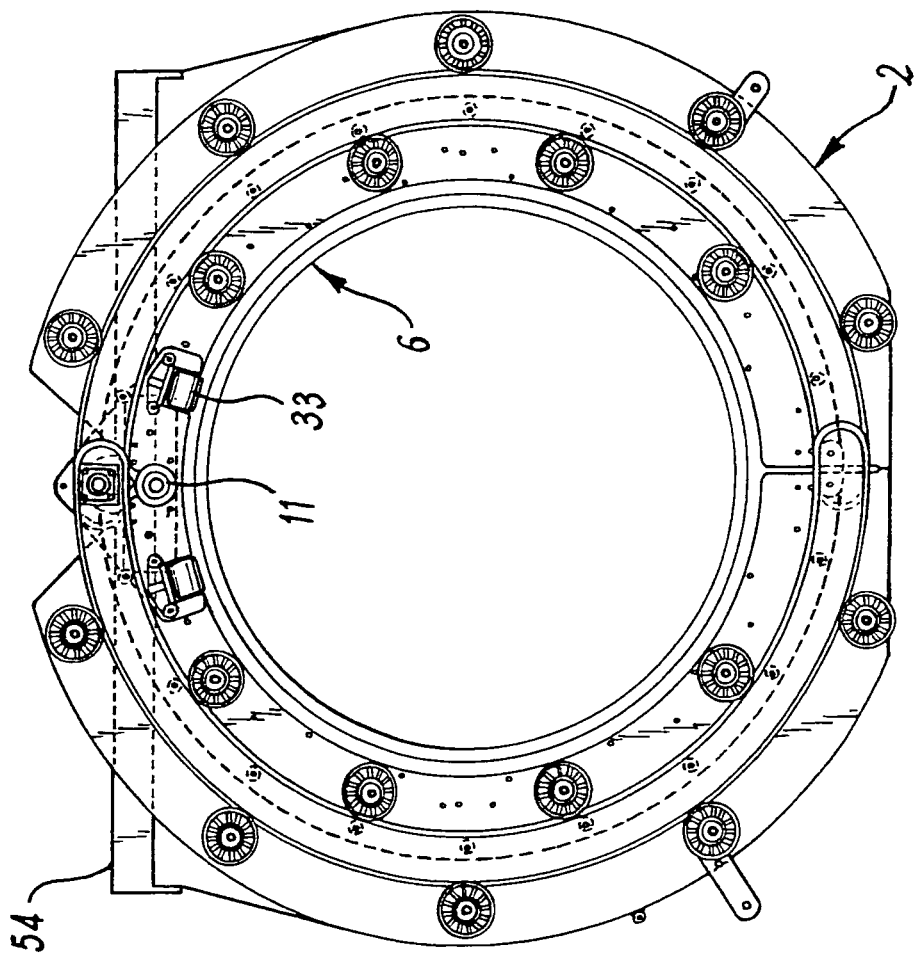
FIG. 2 is a front elevational view of the apparatus of FIG. 1, mounted on a pipe, with the apparatus in the closed position.
Figure 3:
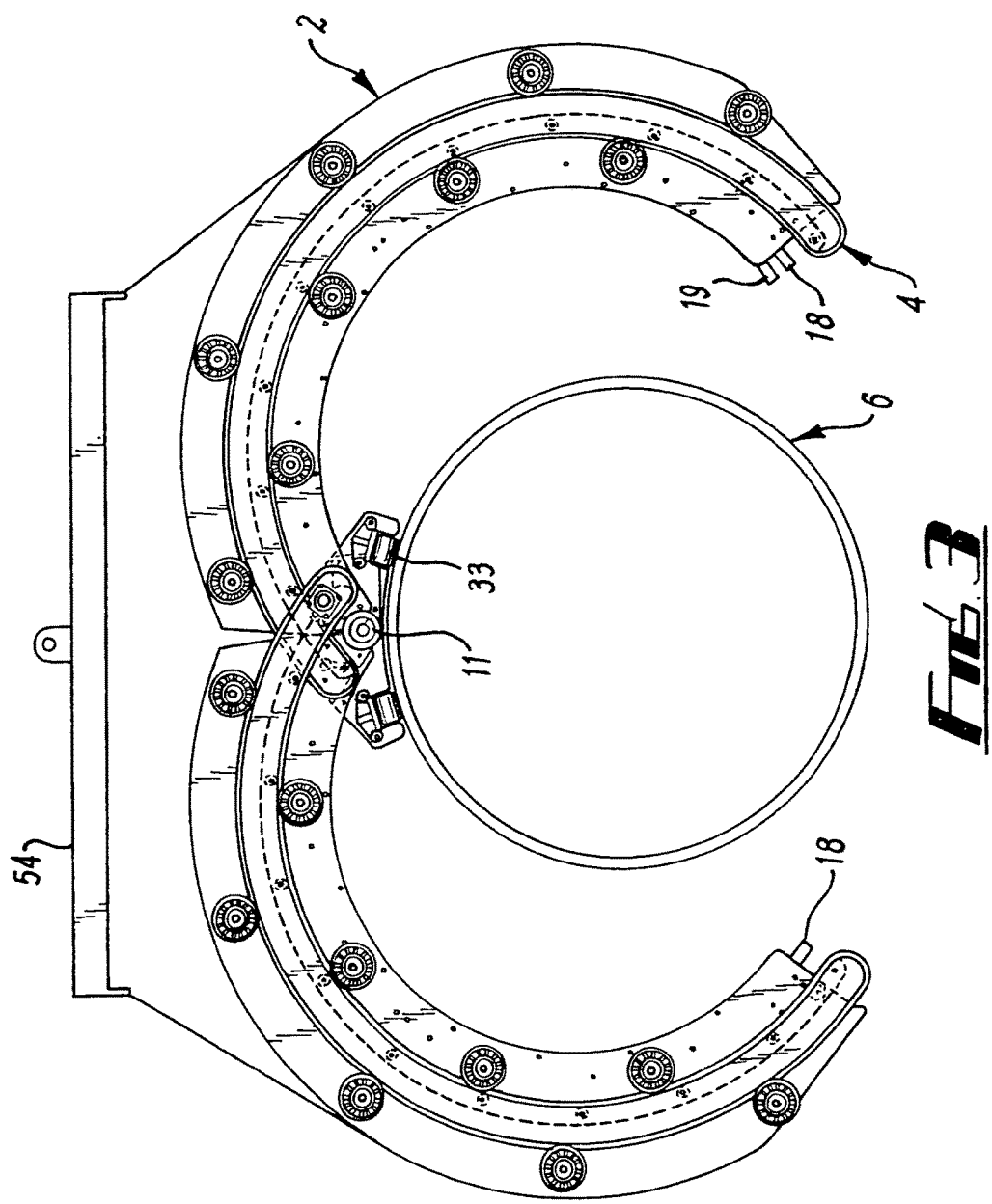
FIG. 3 is a front elevational view of the apparatus of FIG. 1 in an open position and partially supported on a pipe.

Referring to the drawings, apparatus for spray coating a pipe, particularly a pipe weld joint or field joint, comprises a stator frame 2 and a rotor frame 4.

The stator frame 2 is intended to be mounted onto a pipe 6 so that it is substantially rotationally fixed relative to the pipe 6. The rotor frame 4 is rotationally mounted to a face of the stator frame such that it can rotate relative to the stator frame.

The stator frame is formed from two generally semi-circular (in cross-section) sections 8,10, pivotally connected together by pivot 11 at one end, enabling the frame to be opened, so that it may be mounted onto a pipe 6, and closed so that it fully encircles the pipe 6. Each section 8,10 is formed from generally circular front and rear face plates 8a,8b, 10a,10b fastened together in a spaced apart arrangement by tie rods 12. There are two sets of tie rods 12 on each frame section, a radially inner set and a radially outer set. A plurality of insulated electrical conductors 14 are arranged side by side along the axial length of each frame section and extend from the free end of one section of the frame to the free end of the other section of the frame. At the free end of each section the conductors 14 terminate in sliding electrical contacts 18. The respective electrical contacts 18 of each section of the frame are arranged to contact each other when the frame 2 is closed so that the conductors 14 form an electrical induction heating coil through which an alternating electrical current can be driven by an external power supply.

Figure 4:
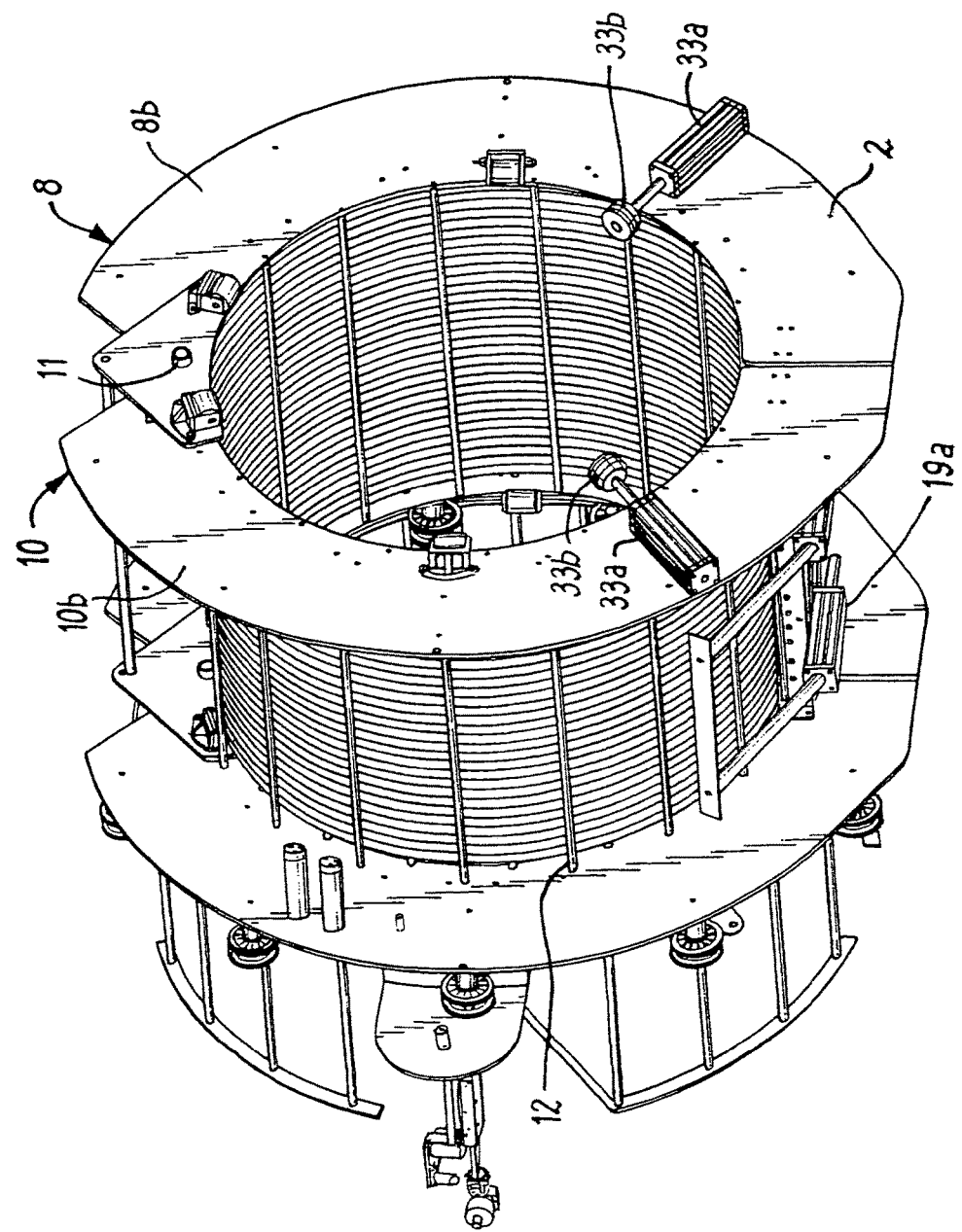
FIG. 4 is a rear perspective view of the apparatus of FIG. 1, with apparatus in a closed position.

A pneumatic actuator driven locking pin 19 is mounted at the free end of one section of the stator frame 2, operative to fasten the two free ends together when the frame is closed. In addition, components of a pneumatically driven clamp 19a is mounted on both sections of the stator frame. This feature is only shown (for clarity) in FIG. 4. The clamp 19a is provided to aid in closing of the stator frame and, in particular, to help in overcoming frictional resistance between the electrical contacts 18 of each section when they are brought together.

End plates 20, fastened by a connector bar 22, are also pivotally connected to the two sections 8,10 of the stator frame 2 by pivot 11.

On the outside face of the front face plates 8a,10a of the stator frame 2 are mounted radially inner and outer sets of axially spaced pairs of guide wheels 24. Each pair of guide wheels is rotatably mounted on a shaft 26 which extends from the face plate 8a,10a.

The guide wheels 24 of the front face plates 8a,10a of the stator frame 2 serve to rotationally mount the rotor frame 4 on the stator frame 2.

Two drive motors 28 are also mounted on one of the front face plates (8a). The motors are mounted to the rear of the face plate with respective drive shafts extending through the face plate 8a. A pair of axially spaced sprockets 30 are mounted on the drive shaft of each motor 28.

To the radially inner surface of each front and rear face plate 8a,8b,10a,10b of the stator frame there is mounted a pair of rollers 32. The surface of the rollers extends beyond the radial inner surface of the face plates and the rollers are mounted for rotation about an axis lying tangentially to the face plate. The rollers 32 are arranged to support the frame on a pipe 6 and permit movement of the frame longitudinally relative to the pipe. A pair of similar rollers 33 is provided on the end plates 20.

The rollers 32,33 facilitate movement of the apparatus along a pipe 6. During operation of the apparatus, though, it is preferred that the apparatus is substantially fixed relative to the pipe. To achieve this, a pair of pneumatically operated claws 33a are mounted on the rear faces 8b,10b respectively of the stator frame 2. These clamps comprise radially movable clamp heads 33b operative to bear against the surface of a pipe on which the apparatus is mounted, thereby to secure the apparatus relative to the pipe.

The rotor frame 4 is comprised of two pairs of arcuate plates 34 with substantially the same length of arc, being about 200 degrees of arc. Each pair comprises an inner plate 34a fastened in spaced-apart relation to an outer plate 34b by a plurality of rods.

The outer plate 34b of one pair of arcuate plates is mounted between front most inner and outer sets of guide wheels 24. The outer edge of the plate has a V-shaped profile which is received into a corresponding circumferential groove on the guide wheels 24. The inner plate 34a of the pair has a toothed outer edge which engages with the front most sprocket of each pair of sprockets 30 of the drive motors 28. The other pair of arcuate plates is similarly mounted in relation to the rearmost guide wheels and sprockets.

As both pairs of arcuate plates extend over 180 degrees of arc, when they are both mounted on the stator frame there is a degree of overlap of the plates. The plates, guide wheels and sprockets are all arranged so that the pairs of plates are interleaved where they overlap. That is to say, where the pair of plates overlap you will find arranged, from the front of the apparatus, an outer plate of the first pair of plates overlying the outer plate from the second pair of plates overlying the inner plate of the first pair overlying the inner plate of the second pair.

Alone, each pair of plates is able to travel continuously (between the inner and outer sets of guide wheels 24) around the stator frame.

In use, though, the two pairs of plates are fastened together so that they overlap each other at both ends. The pairs of plates are fastened together by a pneumatic actuator operated latch 40, which may comprise a locking pin, mounted towards one end of a pair of arcuate plates and arranged to releasably engage the other pair of plates near a free end of those plates. When the pairs of plates are fastened together so they overlap each other at both ends they can be continuously driven relative to the stator frame by the drive motors as one of each of the two pairs of sprockets will always be engaged with an inner plate of one of the pairs of arcuate plates. If the plates are stopped so that each pair of plates is mounted only on one section of the stator frame 2 and the latch 40 disengaged, the stator frame 2 may be opened, together with rotor frame 4. A pneumatic actuator driven locking clamp 41 is mounted on the front face of each section of the stator frame. These clamps operate to lock the pairs of arcuate plates 34 relative to the stator frame when the frame is opened so that the arcuate plates do not slide out of place.

As the two pairs of arcuate plates of the rotor frame are separate from one another the rotor frame does not need to extend through the axis of the pivot 11 of the stator frame. Therefore, the rotor frame can differ in radius to the stator frame. This is advantageous. To maximise the heating efficiency of an induction heating coil it is desirable that it is as close to the outside surface of a pipe to be heated as possible. However, it is also desirable that the electrical cable or conductors of the coil extend through the pivot axis of a pivoted frame to avoid stretching or undue flexing of the cable or conductors when the frame is opened and closed. With the described arrangement, therefore, the pivot axis of the two sections of the stator frame can be positioned to lie as close to a pipe on which the frame is to be mounted as desired without affecting the spacing of the rotor frame from the pipe. A greater spacing of the rotor frame from the pipe is actually desired, for reasons which will become apparent below.

Mounted to one of the pairs of the arcuate plates of the stator frame is an applicator 42 for applying a coating to the outside surface of a pipe on which the apparatus is mounted. The applicator is mounted to the front most arcuate plate of one of the pairs of arcuate plates via a radial plate 44 and an axial rod assembly 46 extending from the radial plate. The applicator 42 is movably mounted on the rod and can be moved along the rod by means of a pneumatic actuator 48. This enables the applicator to be moved longitudinally relative to a pipe on which the apparatus is mounted, and relative to remainder of the apparatus. This enables the applicator to apply a coating to a wider region of the pipe than would otherwise be the case.

A guard rail 50 is mounted on each pair of arcuate plates, on rods 51. The rods 51 are of sufficient length that the guard rail 50 lies forward of the arcuate plates 34 by at least as much as the front of the applicator 42 or its mountings. The guard rail 50 and associated rods 51 serve to support hoses (not shown) employed to supply coating material to the coating applicator as it travels around the circumference of a pipe 6 to be coated.

The actuators for driving the locking pin 19, latch 40, clamps 19*a*, 41 and applicator 42, drive motors 28 and the applicator itself 42 are controlled by a control means 52. The control means 52 may be mounted on or separately to the apparatus and also controls the supply of electrical current to the induction heating coil formed by the electrical conductors 14 when the apparatus is closed.

The control means 52 allows manual control of the apparatus but could also be configured to allow for a degree of automatic control. The control means also includes a number of safety interlocks.

These prevent the locking pin 19 and clamp 19*a* of the stator frame 2 from releasing, and hence the frame being opened, unless the latch 40 which fastens the two pairs of arcuate plates has been released and the locking clamps 41 on the stator frame operated to lock the arcuate plates of the rotor frame relative to the stator frame. Similarly the clamps 41 must be released and the two sections of the stator frame and two pairs of arcuate plates of the rotor frame fastened by the latch 40 together before the drive motors 28 can be operated.

The apparatus is used to apply a coating, typically a liquid or powder coating, to jointed end sections of pipeline where it is necessary to heat the end sections before and/or after the application of the coating.

In use the apparatus is suspended from a hoist or other suitable lifting apparatus by way of a yoke 54 connected by lines to each section of the stator frame. Lifting the apparatus by the yoke 54 will cause the two sections of the stator frame to separate, opening the frame and allowing the apparatus to be mounted on and removed from a pipe 6.

In one approach the apparatus is lifted by way of the yoke 54, opening the stator 2 and rotor 4 frames (with the separate pairs of arcuate plates of the rotor frame clamped to the stator frame) and then lowered onto a pipeline so that the stator frame and in particular the induction heating coil on the frame, overlies the region of the pipeline to be coated.

The apparatus is then supported on the pipeline on rollers 33 of the end plates 20 which allow the apparatus to be moved along the length of the pipeline, if required, so that it is a desired position. When the apparatus is correctly positioned relative to the pipeline the clamp 19*a* is operated to draw the pivotally connected parts of the apparatus together, and clamps 33*a* are engaged secure the first frame relative to the pipeline.

The control means 52 is then operated to cause the relevant actuator to lock the two sections of the stator frame 2 together with the locking pin 19 and to engage clamps 33*a*. An alternating current is then fed through the conductors 14 forming the induction heating coil to heat the region of the pipeline underlying the coil.

The apparatus is then moved longitudinally relative to the pipeline so that the applicator 42 overlies the region of the pipeline to be coated (i.e. that previously heated by the induction heating coil). To enable this movement the clamps 33*a*, are released so the apparatus is supported on the pipeline only by the rollers 33 on the end plates 20. The apparatus may be moved or the pipe may be moved in order to effect longitudinal relative movement between the apparatus and the pipe.

When the apparatus has been repositioned the clamps 33*a* are reengaged. The two pairs of arcuate plates of the rotor frame are then locked together by operation of the latch 40 and the clamps 41 securing the plates relative to the stator frame 2 are released. The applicator 42 is then operated to spray a coating onto the pipeline and the drive motors 28 operated to drive the rotor frame 4 relative to the stator frame 2 and hence move the applicator completely around the pipeline so as to apply coating completely around the circumference of the pipeline.

After the applicator has been moved completely around the pipe in one direction, or just over one complete journey around the pipe, the drive motors are reversed. Prior to reversal the applicator 42 may be moved longitudinally relative to the pipe by moving it along its mounting rod 46.

The rotor frame is rotated sufficiently and the applicator operated and moved along the mounting rod as desired until the region of the pipe over which the rotor frame is mounted has been adequately coated.

When coating is complete the rotor frame is returned to a position where each pair of arcuate plates is supported only on one section of the stator frame. The clamps 41 on the stator frame are then operated to secure each pair of arcuate plates to the section of the stator frame on which it is mounted, the latch 40 is released to allow the two pairs of arcuate plates 34 to detach and the latch 19 is released to allow the two sections of the stator frame to separate. The apparatus is then lifted via the yoke 54, causing the stator and rotor frames to open, and raising it off the pipe, and repositioned onto another pipe joint to be coated.

The motors and various actuators are preferably pneumatically driven. Alternatives, such as electrical or hydraulic, could be employed.

Combining heating and coating apparatus side by side on a single apparatus enable field joints on pipelines to be coated quickly and efficiently, even in cold ambient conditions.

Another embodiment is possible where the first and second frames remain closed, or cannot be opened other than by dismantling the apparatus, a so called "bobbin" type apparatus. It will be readily apparent to the skilled person that certain features of the embodiment described above can be deleted on a corresponding bobbin type apparatus. In particular the various actuators and latches involved in opening and closing the apparatus.

The above embodiments are described by example only. Many variations are possible without departing from the invention.

The invention claimed is:

1. Apparatus for coating a pipe, the apparatus comprising:
a first frame arranged to be mounted on the pipe, electrical conductors mounted on the first frame arranged to form an induction heating coil which encircles the pipe when the first frame is mounted on the pipe;
a second frame rotatably mounted on the first frame;
and a coating applicator mounted on the second frame and arranged to apply a coating onto a surface of the pipe when the apparatus is mounted on the pipe,
wherein the first and second frames and the coating applicator are arranged such that when the apparatus is mounted on the pipe the coating applicator is disposed to one side of the induction heating coil in a direction along the longitudinal axis of the pipe, and able to apply coating to a surface of the pipe alongside the surface of the pipe underlying the induction heating coil; and
wherein the second frame is operable with the first frame between an open state and a closed state; and
wherein the induction heating coil is radially closer to the pipe than the coating applicator.

2. Apparatus for coating a pipe according to claim 1, wherein the first frame is operable between an open state in which the first frame may be placed over and removed from the pipe and a closed state in which the first frame may capture the pipe to mount the apparatus on the pipe, wherein the electrical conductors are arranged to form the induction heating coil when the first frame is in the closed state, and wherein the first and second frames and the coating applicator are arranged such that when the apparatus is mounted on the pipe and the first and second frames are in the closed state the coating applicator is disposed to one side of the induction heating coil and able to apply coating to a surface of the pipe alongside the surface of the pipe underlying the induction heating coil.

3. Apparatus as claimed in claim 1, wherein the electrical conductors are mounted on the second frame.

4. Apparatus as claimed in claim 1, wherein the first frame comprises at least two pivotally connected sections.

5. Apparatus as claimed in claim 4, wherein the electrical conductors extend from a free end of one section of the first frame to a free end of another section of the first frame when in the open state.

6. Apparatus as claimed in claim 5, wherein at the free end of each section the electrical conductors terminate in electrical contacts and the respective electrical contacts of each section are arranged to contact each other when the frame is closed so that the electrical conductors form an electrical induction heating coil through which an alternating current can be driven.

7. Apparatus as claimed in claim 1, further comprising at least one roller mounted on the first frame to facilitate movement of the first frame longitudinally relative to the pipe.

8. Apparatus as claimed in claim 1, wherein the coating applicator is arranged to spray a liquid or powder coating.

9. Apparatus as claimed in claim 1, wherein the first frame and the second frame are disposed adjacent each other along the longitudinal axis of the pipe.

10. Apparatus as claimed in claim 1, wherein the first frame may be substantially rotationally fixed relative to the pipe.

11. Apparatus as claimed in claim 1, wherein the first frame comprises an end face and the second frame is mounted on the end face.

12. Apparatus as claimed in claim 1, wherein the second frame is formed from at least two, separate, generally arcuate members.

13. Apparatus as claimed in claim 12, wherein the total arc length of the arcuate members is greater than 360 degrees so that when mounted on the first frame, the arcuate members forming the second frame overlap each other.

14. Apparatus as claimed in claim 1, wherein the second frame is mounted on the first frame by way of wheels or bearings, which allow the second frame to rotate relative to the first frame.

15. Apparatus as claimed in claim 1, comprising at least one drive motor operative to rotate the second frame relative to the first frame.

16. Apparatus as claimed in claim 15, wherein the second frame is formed from at least two separate generally arcuate members and at least one arcuate member is always engaged with at least one drive motor.

17. Apparatus as claimed in claim 1, wherein a radius of the first frame is different than a radius of the second frame.

18. Apparatus as claimed in claim 1, comprising a hose support operative to support one or more hoses used to supply coating material to the coating applicator.

19. Apparatus as claimed in claim 2, wherein the electrical conductors are mounted on the second frame.

20. Apparatus as claimed in claim 2, wherein the first frame comprises at least two pivotally connected sections.

21. Apparatus as claimed in claim 20, wherein the electrical conductors are mounted on the first frame and extend from a free end of one section to a free end of another section when in the open state.

22. Apparatus as claimed in claim 21, wherein at the free end of each section the conductors terminate in electrical contacts and the respective electrical contacts of each section are arranged to contact each other when the sections are closed so that the conductors form an electrical induction heating coil through which an alternating current can be driven.

23. Apparatus as claimed in claim 2, comprising at least one roller mounted on the first frame to facilitate movement of the first frame longitudinally relative to the pipe.

24. Apparatus as claimed in claim 2, wherein the first frame and the second frame are disposed adjacent each other along a longitudinal axis of the pipe on which the apparatus is mounted.

25. Apparatus as claimed in claim 2, wherein the first frame may be substantially rotationally fixed relative to the pipe.

26. Apparatus as claimed in claim 2, wherein the first frame comprises an end face and the second frame is mounted on the end face.

27. Apparatus as claimed claim 2, wherein the second frame is formed from at least two, separate, generally arcuate members.

28. Apparatus as claimed in claim 27, wherein the total arc length of the arcuate members is greater than 360 degrees so that when mounted on the first frame, the arcuate members fowling the second frame overlap each other.

29. Apparatus as claimed in claim 2, wherein the second frame is mounted on the first frame by way of wheels or bearings, which allow the second frame to rotate relative to the first frame.

30. Apparatus as claimed in claim 2, further comprising at least one drive motor operative to rotate the second frame relative to the first frame.

31. Apparatus as claimed in claim 15, wherein the second frame is formed from at least two separate generally arcuate members and at least one arcuate member is always engaged with at least one drive motor.

32. Apparatus as claimed in claim 2, comprising a first frame whose radius is different to the radius of the second frame.

33. Apparatus as claimed in claim 2, comprising a hose support operative to support one or more hoses used to supply coating material to the coating applicator.

\* \* \* \* \*